T. A. HANSLEY.
Harrow.
No. 210,525. Patented Dec. 3, 1878.
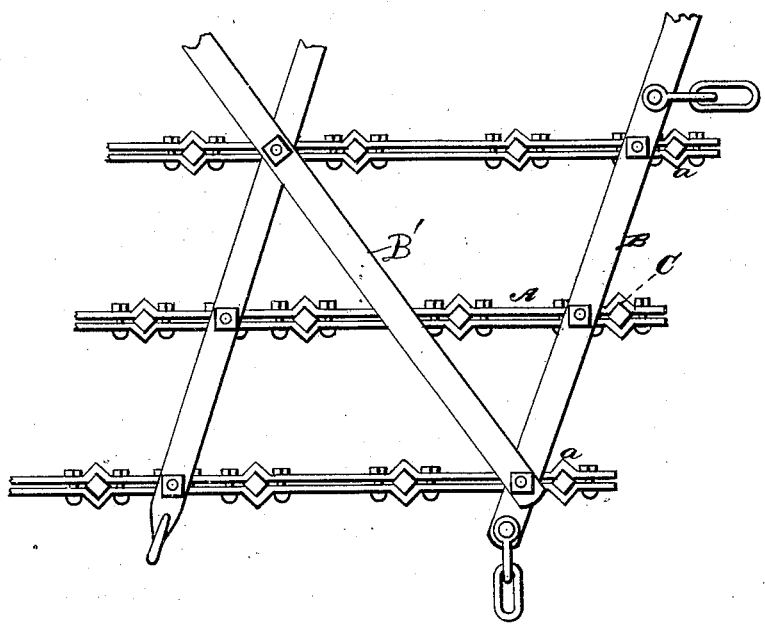
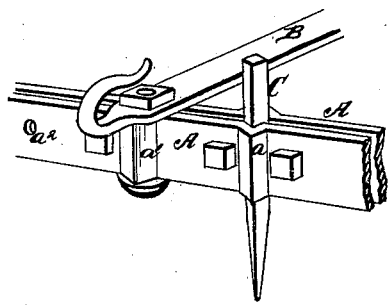
WITNESSES
Robert Everitt
H. Clay Smith
INVENTOR.
Tobias A. Hansley
By Gilmore, Smith & Co.
ATTORNEYS.

UNITED STATES PATENT OFFICE.

TOBIAS A. HANSLEY, OF DAYTON TOWNSHIP, BUTTE COUNTY, CALIFORNIA.

IMPROVEMENT IN HARROWS.

Specification forming part of Letters Patent No. 210,525, dated December 3, 1878; application filed October 19, 1878.

*To all whom it may concern:*

Be it known that I, TOBIAS ANES HANSLEY, of Dayton township, in the county of Butte and State of California, have invented a new and valuable Improvement in Harrows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top-plan view of my harrow, and Fig. 2 is a perspective detail view of the same.

My invention relates to a harrow for agricultural purposes; and the novelty consists in the construction and arrangement of parts, as will be more fully hereinafter set forth, and pointed out in the claim.

Between teeth-plates, each having half-sockets to receive the teeth, and provided with means to be securely bolted together, I place the harrow-teeth. These plates are arranged in a series of diamond shape, suitably braced by plates upon the upper surface, bolted thereto.

The harrow is, preferably, made of metal entire, and may be formed in gangs of two or more. The teeth are readily removable for sharpening, and the like, and they are firmly held in the sockets.

Referring to the drawings, A represents the half-plates, each provided with half-sockets $a$ to embrace the teeth, with half-recesses $a^1$ to receive the brace-bolts, and with lateral apertures $a^2$, through which the bolts are passed to bind the plates firmly together and hold the teeth in position.

B B' represent the braces, applied as shown; and C, the teeth.

My harrow is made of any suitable form, or material, or size, and is provided with the ordinary hooks, clevises, &c.

It will be noticed that the half-recesses $a^1$, which receive the brace-bolts, enable me to connect the rails of the harrow-frame rigidly together by the braces B B and the diagonal brace B', the teeth C being secured in the half-recesses $a^1$.

What I claim as new, and desire to secure by Letters Patent, is—

In a harrow, the half-plates A, provided with half-recesses $a^1$ to receive the brace-bolts, in combination with the rigid braces B B and the diagonal brace B', and bolts and nuts for securing the parts rigidly together, as shown and described.

In testimony that I claim the above I have hereunto subscribed my name in the presence of two witnesses.

TOBIAS ANES HANSLEY.

Witnesses:
S. J. BURTON,
J. W. McINTOSH.